United States Patent
Kapadia (10) Patent No.: US 11,733,986 B2
(45) Date of Patent: Aug. 22, 2023

(54) SYSTEM FOR MANAGING MULTIPLE CLOUDS AND METHOD THEREOF

(71) Applicant: Chaitanya Kapadia, Union City, CA (US)

(72) Inventor: Chaitanya Kapadia, Union City, CA (US)

( * ) Notice: Subject to any disclaimer, the term of this patent is extended or adjusted under 35 U.S.C. 154(b) by 0 days.

(21) Appl. No.: 17/104,705

(22) Filed: Nov. 25, 2020

(65) Prior Publication Data

US 2021/0208859 A1 Jul. 8, 2021

Related U.S. Application Data (60) Provisional application No. 62/957,969, filed on Jan. 7, 2020.

(51) Int. Cl.
| | |
|---|---|
| *G06F 9/445* | (2018.01) |
| *G06F 8/60* | (2018.01) |
| *H04L 67/00* | (2022.01) |
| *H04L 9/40* | (2022.01) |
| *G06F 3/0482* | (2013.01) |
| *H04L 67/10* | (2022.01) |
| *H04L 67/75* | (2022.01) |

(52) U.S. Cl.
CPC .............. *G06F 8/60* (2013.01); *G06F 3/0482* (2013.01); *H04L 63/08* (2013.01); *H04L 67/10* (2013.01); *H04L 67/34* (2013.01); *H04L 67/75* (2022.05)

(58) Field of Classification Search
CPC ....................................................... G06F 8/60
USPC ....................................................... 717/178
See application file for complete search history.

(56) References Cited

U.S. PATENT DOCUMENTS

| | | | | |
|---|---|---|---|---|
| 7,779,091 | B2* | 8/2010 | Wilkinson | H04L 67/1002 709/220 |
| 8,638,674 | B2* | 1/2014 | Nugent | H04L 41/5045 370/242 |
| 9,069,599 | B2* | 6/2015 | Martinez | H04L 63/102 |
| 9,747,635 | B1* | 8/2017 | Ward, Jr. | G06Q 30/08 |
| 9,811,365 | B2* | 11/2017 | Borthakur | G06F 9/5083 |
| 9,965,377 | B1* | 5/2018 | Russell | G06F 8/71 |
| 10,225,335 | B2* | 3/2019 | Fu | H04L 67/1014 |
| 10,237,118 | B2* | 3/2019 | Du | H04L 67/1095 |
| 10,341,409 | B2* | 7/2019 | Chen | G06F 9/455 |
| 11,188,390 | B2* | 11/2021 | Brebner | G06F 9/5055 |
| 2014/0067994 | A1* | 3/2014 | Puttaswamy Naga | H04L 67/1095 709/217 |
| 2017/0004018 | A1* | 1/2017 | Mangtani | G06F 9/5038 |
| 2017/0244787 | A1* | 8/2017 | Rangasamy | H04L 67/10 |
| 2020/0218579 | A1* | 7/2020 | D M | H04L 41/5054 |
| 2020/0249936 | A1* | 8/2020 | Barfield, Jr. | G06F 8/433 |

(Continued)

OTHER PUBLICATIONS

International Search Report and Written Opinion, issued by International Searching Authority in corresponding International Application No. PCT/US2020/066566, dated Feb. 5, 2021.

*Primary Examiner* — Evral E Bodden
(74) *Attorney, Agent, or Firm* — ArentFox Schiff LLP (57) ABSTRACT

Package deployment over multiple cloud computing systems is provided where a package that includes a software container, file or a data package can be obtained, where the package is compatible to be deployed to multiple cloud computing systems. A selected cloud computing system that is selected from the multiple cloud computing systems can be determined, and the package can be deployed to the selected cloud computing system.

19 Claims, 9 Drawing Sheets

(56) References Cited

U.S. PATENT DOCUMENTS

2020/0304571 A1\* 9/2020 Ranjan ................ H04L 67/1097
2020/0351650 A1\* 11/2020 Maria ................. G06F 16/1824
2021/0019194 A1\* 1/2021 Bahl ..................... G06F 9/3877

\* cited by examiner

Activity-Service Details

📄 Release Notes Generator

📊 Last 100 Builds

🔧 Container History (Sorted by time built)

PDF

| Container Version | Built Date | Commit Author | User Stories | Development | CI | Test | Staging |
|---|---|---|---|---|---|---|---|
| master-444-89bcbf | 03 months ago (2019-08-26, 23:12:49.197) | syoung | DE159 | Deploy | Redeploy | Deploy | Deploy |
| master-443-89bcbf | 03 months ago (2019-08-26, 22:46:27.906) | syoung | DE159 | Deploy | Deploy | Deploy | Deploy |
| master-441-89bcbf | 03 months ago (2019-08-26, 00:37:31.049) | syoung | | Redeploy | Deploy | Deploy | Deploy |
| PK-DE159-440-144840 | 03 months ago (2019-08-26, 00:25:17.44) | Uttam Jaiswal | | Deploy | Deploy | Deploy | Deploy |

SYSTEM FOR MANAGING MULTIPLE CLOUDS AND METHOD THEREOF

CLAIM OF PRIORITY UNDER 35 U.S.C. § 119

The present Application for Patent claims priority to Provisional Patent Application No. 62/957,969, entitled "MULTI CLOUD ENABLED CONSOLE WITH ENVIRONMENT MANAGEMENT AND CONTAINER AND PACKAGE DEPLOYMENTS" filed Jan. 7, 2020, which is hereby expressly incorporated by reference herein for all purposes

TECHNICAL FIELD

The following disclosure generally relates to cloud computing systems, and more specifically to managing and deploying software, files or data across multiple cloud computing systems.

BACKGROUND

Cloud computing systems have been developed to provide distributed storage and access of software, files and data across multiple devices connected via a network, such as the Internet. Using distributed nodes to store the software and data can improve reliability of the software and data through redundancy, improved on-demand access of the software and data from various other nodes in the network, more efficient execution of software or retrieval of data by using certain nodes or services in the network, and/or the like. Today, there are multiple providers of public cloud computing systems that can be used by anyone to host software, files or data. In addition, private cloud computing systems are provided that can be used in an internal network, such as a private network within an organization. In either case, an organization or single user can store software, files and data in a public or private cloud computing system to allow access thereof from other nodes, users, and organizations, among other entities.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method for managing or managing deployment of software packages, files, or data packages to multiple cloud computing systems is provided. The method includes obtaining a package that includes a software container, file, or a data package, wherein the package is compatible to be deployed to multiple cloud computing systems, determining a selected cloud computing system that is selected from the multiple cloud computing systems, authenticating, based on determining the selected cloud computing system, an account with the selected cloud computing system, and deploying, based on authenticating the account with the selected cloud computing system, the package to the selected cloud computing system.

In another example, a system for managing or managing deployment of software packages or data packages to multiple cloud computing systems is provided that includes a memory, and at least one processor coupled to the memory. At least one processor is configured to obtain a package that includes a software container, file, or a data package, wherein the package is compatible to be deployed to multiple cloud computing systems, determine a selected cloud computing system that is selected from the multiple cloud computing systems, authenticate, based on determining the selected cloud computing system, an account with the selected cloud computing system, and deploy, based on authenticating the account with the selected cloud computing system, the package to the selected cloud computing system.

In a further example, a non-transitory computer-readable medium storing computer executable code for managing or managing deployment of software packages, files or data packages to multiple cloud computing systems is provided. The code includes code for obtaining a package that includes a software container, file, or a data package, wherein the package is compatible to be deployed to multiple cloud computing systems, determining a selected cloud computing system that is selected from the multiple cloud computing systems, authenticating, based on determining the selected cloud computing system, an account with the selected cloud computing system, and deploying, based on authenticating the account with the selected cloud computing system, the package to the selected cloud computing system.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "cloud computing system," as used herein, can refer to a system that includes multiple nodes that can communicate over a network to form a network-accessible data center or repository for storing software or files or data. Cloud computing systems can include compute clouds for storing executable computing resources, relational database storage systems for storing data in a relational database, or other data storage services. In addition, a cloud computing system can be a public cloud computing system accessible over a public network, such as the Internet, or can be a private cloud computing system accessible in a private network that can be internal to an organization or other entity.

The term "container," as used herein, can refer to a level of abstraction or data construct that stores a software executable or other software build or object, which may include the code of the executable and any dependencies used to execute the software, such as runtime, system tools, system libraries, settings, etc. In this regard, a container can be provided to a computing environment, such as a cloud computing system, for executing the underlying code as a standalone executable package. In an example, a given computing environment can be compatible to execute the software in the container by including an engine to facilitate execution of the container on the computing environment. Multiple cloud computing systems, for example, can each include an engine for a type of container to facilitate executing associated software.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "package," as used herein, can refer to a container, build, file or a collection of data, which can be deployed to a cloud computing system. The collection of data can include a database data structure, database table, files, and/or the like.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Various examples described herein relate to managing or managing deployment of packages, which may include software packages or containers (e.g., software builds, objects, etc.), files (e.g. configuration text files, document files, etc.), data packages (e.g., database data structures, database tables, files, etc.), or the like, over one or more of multiple cloud computing systems. In an example, access to various public or private cloud computing systems can be managed, and a software package can be deployed thereto as a container for executing on one or more of the cloud computing systems, or a data package can be deployed thereto for accessing from one or more of the cloud computing systems. In one example, selection of a cloud computing system for deployment can be provided by a user interface to allow a user to select the cloud computing system for a specific package. In another example, selection of a cloud computing system can be determined additionally or alternatively based on one or more criteria, such as an associated cost for deploying the package. In an example, software can be deployed in a container to provide support for executing the software in multiple different cloud computing systems.

In some examples, a user interface is provided for displaying one or more parameters or statistics related to deployment of the package at one or more cloud computing systems. In addition, the user interface can allow for deploying a given package to a different or additional cloud computing system by selecting the package and the cloud computing system. In this regard, the interface, based on the selection of the package and/or the cloud computing system, can interface with the cloud computing system, which may include authenticating on the cloud computing system, and can deploy the package as a software container, file or data package on the cloud computing system. In the various examples described herein, management of deploying software and data packages or resources is provided by a centralized entity or associated interface to simplify management of deploying the packages in various cloud computing systems that may have different architectures, interfaces, authentication parameters, etc. In an example, the centralized entity can decrease complexity associated with manually deploying packages on the various cloud computing systems by focusing on units of binary code used in production for software packages and/or by focusing on raw data for data packages. In addition, in some examples, the centralized entity can apply cost containment in selecting cloud computing systems that are cost effective.

Figure 1:
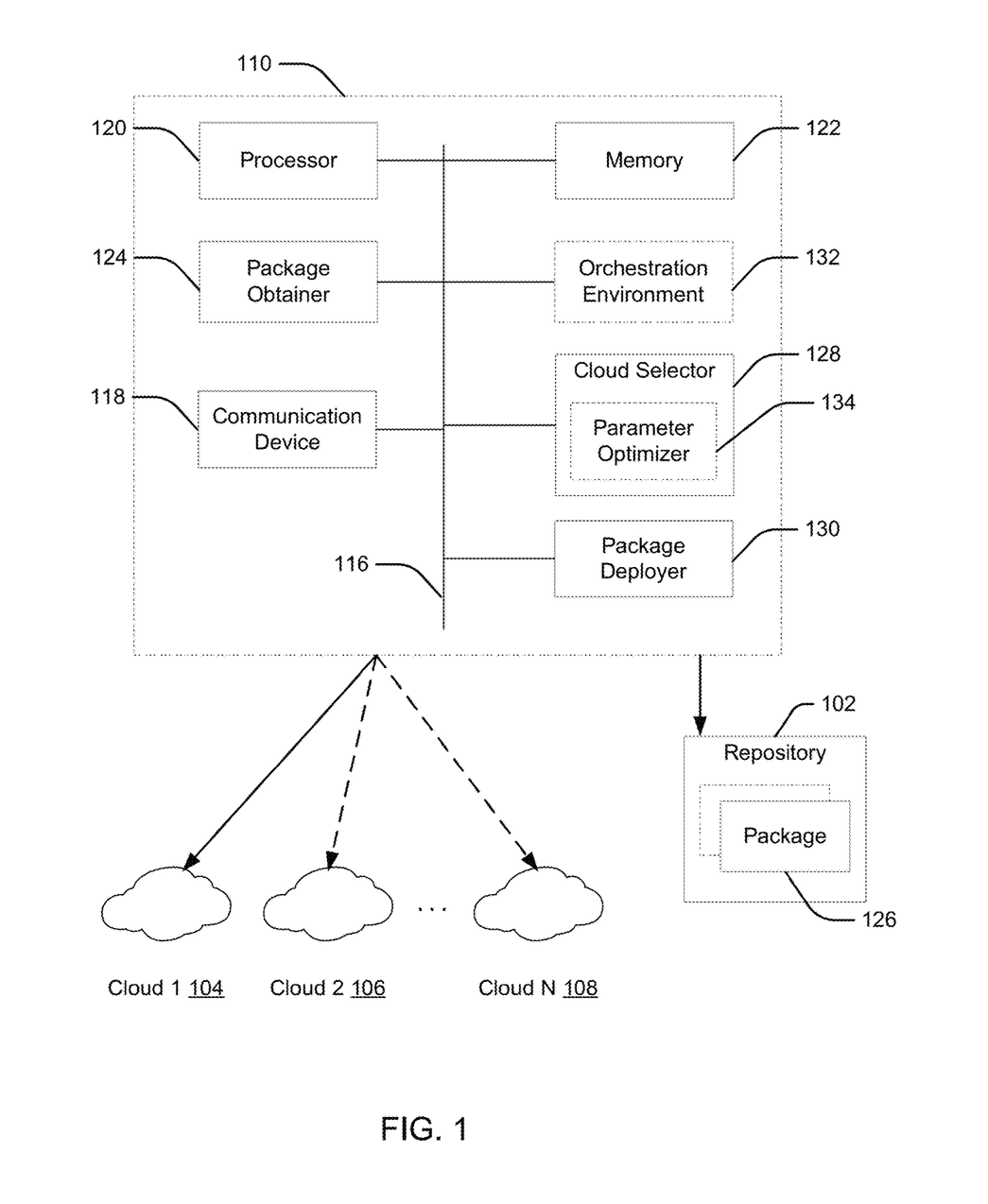
FIG. 1 illustrates a schematic view of an example operating environment of a package deployment system according to one aspect of the disclosure.

FIG. 1 shows a schematic view of an example operating environment 100 of a package deployment system 110 and example methods according to aspects described herein. For example, operating environment 100 can include a package deployment system 110 that can communicate with a repository 102 to obtain one or more packages for deploying and can communicate with one or more cloud computing systems, such as cloud 1 104, cloud 2 106, . . . , cloud N 108, to deploy or manage deployment of the one or more packages to the one or more cloud computing systems. Components of the package deployment system 110, as well as the components of other systems, hardware architectures and software architectures discussed herein, can be combined, omitted or organized into different architectures for various aspects of the disclosure. However, the example aspects and configurations discussed herein focus on the operating environment 100 as illustrated in FIG. 1, with corresponding system components and related methods.

As shown in FIG. 1, a package deployment system 110 can optionally include a package obtainer 124 for obtaining one or more packages 126 from a repository 102 or other data store. As described herein, the packages can include software packages that may be packaged in a container for deployment on cloud computing systems, data packages that are packaged for storage on cloud computing systems, etc. The package deployment system 110 can also optionally include a cloud selector 128 for selecting one of multiple cloud computing systems to which to deploy the one or more packages 126, and/or a package deployer 130 for deploying the one or more packages 126 to the selected cloud computing system. In an example, the cloud selector 128 and/or package deployer 130 optionally can be part of, or can otherwise operate in conjunction with, an orchestration environment 132 for managing access and communication with the multiple cloud computing systems (e.g., cloud 1 104, cloud 2 106, . . . , cloud N 108). In another example, cloud selector 128 may optionally include a parameter optimizer 134 for automating one or more decisions in selecting a cloud computing system for deploying the one or more packages 126.

In one aspect, the package deployment system 110 can communicate with the repository 102 as a remotely located repository that manages storage of, access to, etc. software packages (whether stored as containers or otherwise) and/or data packages. For example, the package deployment system 110 and repository 102 may operate at different corporate networks or otherwise different infrastructures (e.g., may be operated by different entities), and the package deployment system 110 may access the repository 102 via the Internet or other wider network. In other examples, the repository 102 may be locally accessible by, or on the same network as, the package deployment system 110. In addition, for example, the package deployment system 110 can communicate with the cloud computing systems (e.g., cloud 1 104, cloud 2 106, . . . , cloud N 108) as public cloud computing systems that are publicly accessible via the Internet and/or as private cloud computing systems that are within an internal network accessible by the package deployment system 110. In one example, orchestration environment 132 can manage access to and communication with the various public or private cloud computing systems.

Package deployment system 110 can also include a communication device 118 that can transmit packets to, and receive packets from, the repository 102, the cloud computing systems, etc. For example, communication device 118 may include a network interface card that can communicate over a local area network (LAN), wireless LAN (WLAN), or other electronic communication technology, such as a cellular or other wireless technology (e.g., a third generation partnership project (3GPP) cellular technology, and Bluetooth®, among other wireless technologies).

Package deployment system 110 can also include or be operably coupled with (or executed by) one or more processors 120 and one or more memories 122 that communicate to effectuate certain actions at the package deployment system 110 (e.g., actions on or associated with package obtainer 124, cloud selector 128, package deployer 130, orchestration environment 132, parameter optimizer 134, and/or other components described herein). In one example, one or more of the package obtainer 124, cloud selector 128, package deployer 130, orchestration environment 132, parameter optimizer 134, processor(s) 120 and/or memory(ies) 122 can be connected via one or more buses 116. Moreover, in one example, repository 102 and/or one or more of the cloud computing systems may include a processor and/or memory, and/or may be operated by processor 120 and/or can utilize memory 122 to effectuate certain actions, such as executing a software package, providing access to a data package, providing a package for deployment, etc.

Figure 2:
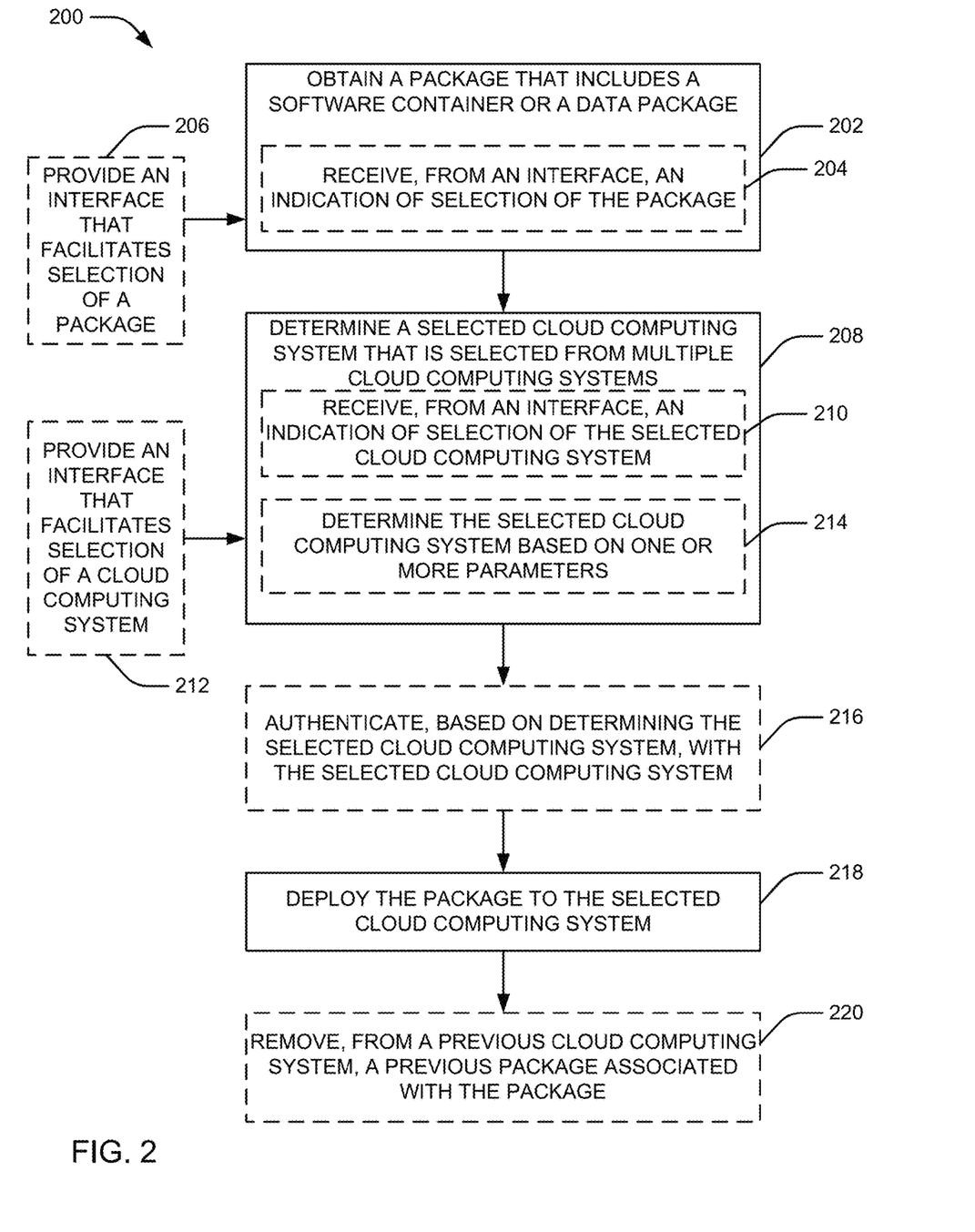
FIG. 2 illustrates a flowchart showing an example method for deploying packages according to one aspect of the disclosure.

Referring now to FIG. 2, which is described in conjunction with the example operating environment 100 of FIG. 1, an example method 200 for deploying a package to a cloud computing system is illustrated.

In block 202, the method 200 can include obtaining a package that includes a software container or a data package. In an aspect, package obtainer 124 (e.g., in conjunction with processor 120 and/or memory 122 of a package deployment system 110) can obtain the package that includes the software container, file or the data package. In an example, package obtainer 124 can obtain the package as one or more packages 126 from a repository 102. For example, the repository 102 can include or can access a code pipeline that stores software code for deployment, and may store binaries of built software applications in containers that facilitate eased deployment to various computing systems, which may include cloud computing systems. In one example, package obtainer 124 can communicate with the repository 102 to determine multiple packages that can be deployed from the repository, which may include recently generated binaries of software packages, data collections that were recently committed for storage in the repository as data packages, etc. In one example, repository 102 can notify the package obtainer 124 of an available package for deployment (e.g., based on an indication in the repository to deploy the package), and the package obtainer 124 can accordingly (e.g., autonomously) obtain the package. In an example, package deployment system 110 can communicate with multiple repositories 102 and/or can manage access (e.g., authentication, communication, etc.) to the repositories 102 to access or obtain various packages 126.

In one example, in obtaining the package at block 202, the method 200 can optionally include, in block 204, receiving, from an interface, an indication of selection of the package. In an aspect, package obtainer 124 (e.g., in conjunction with processor 120 and/or memory 122 of a package deployment system 110) can receive, from the interface, the indication of selection of the package. In one example variation, the method 200 can optionally include, in block 206, providing an interface that facilitates selection of a package. In an aspect, package deployment system 110 (e.g., via processor 120 and/or memory 122) can provide the interface that facilitates selection of the package. Various examples of interfaces are described herein. In an example, package deployment system 110 can provide the interface to list available packages at the repository 102 that can be deployed to other systems. In this example, the interface can allow selection of one of the packages in the list for deployment or other management actions.

In block 208, the method 200 can include determining a selected cloud computing system that is selected from multiple cloud computing systems. In an aspect, cloud selector 128 (e.g., in conjunction with processor 120 and/or memory 122 of a package deployment system 110) can determine the selected cloud computing system that is selected from multiple cloud computing systems. For example, cloud selector 128 can determine the selected cloud computing system for deploying the package. In an example, cloud selector 128 can determine the selected cloud computing system from multiple available cloud computing systems (e.g., one of cloud 1 104, cloud 2 106, ..., cloud N 108) based on manual selection thereof, automatic selection based on one or more determinations, etc., as described further herein.

In one aspect, in determining the selected cloud computing system at block 208, the method 200 can optionally include, in block 210, receiving, from an interface, an indication of selection of the selected cloud computing system. In an aspect, cloud selector 128 (e.g., in conjunction with processor 120 and/or memory 122 of a package deployment system 110) can receive, from the interface, the indication of selection of the selected cloud computing system. In an example, the method 200 can optionally include, in block 212, providing an interface that facilitates selection of a cloud computing system. In an aspect, package deployment system 110 (e.g., via processor 120 and/or memory 122) can provide the interface that facilitates selection of the cloud computing system. Various examples of interfaces are described herein. In an example, package deployment system 110 can provide the interface to list available cloud computing systems (e.g., cloud 1 104, cloud 2 106, ..., cloud N 108) available for deploying the obtained package 126. In this example, the interface can allow selection of one of the cloud computing systems in the list for deploying the package 126 or other management actions. In one example, as described further herein, an orchestration environment 132 can manage access to and communication with the multiple cloud computing systems, and in an example, package deployment system 110 can obtain the list of multiple cloud computing systems from the orchestration environment 132.

In an example, in determining the selected cloud computing system at block 208, the method 200 can optionally include, in block 214, determining the selected cloud computing system based on one or more parameters. In an aspect, parameter optimizer 134 or other components (e.g., in conjunction with processor 120 and/or memory 122, cloud selector 128, etc. of a package deployment system 110) can determine the selected cloud computing system based on the one or more parameters. For example, parameter optimizer 134 can determine one or more parameters associated with deploying the package 126 on different cloud computing systems, which may include a cost associated with deploying the package 126 on different cloud computing systems, efficiency, resource, or optimization parameters associated with deploying the package 126 on different cloud computing systems, etc.

For instance, the cost can be based on a size of the package 126 (e.g., size of the container for a software package), whether the package 126 is to be deployed as a spot instance or reserved instance (e.g., a period of time for which the package is to be deployed), among other options for deployment. Thus, for example, parameter optimizer 134 can determine nuances of specific accounts on the cloud computing systems, which the parameter optimizer 134 can determine via application programming interface (API) calls to the cloud computing systems, and the parameter optimizer 134 can determine properties of the package 126 or related deployment. Parameter optimizer 134, in this example, can accordingly determine a cost of deploying the package 126 on each of multiple cloud computing systems. In an example, parameter optimizer 134 can provide cost information to the cloud selector 128 to facilitate manual or automated selection of the cloud computing system. For example, cloud selector 128 can automatically select a most cost effective cloud computing system for deploying the package 126 (e.g., by determining the cloud computing system having the lowest determined cost). In another example, package deploying system 110 can display cost information on the interface to allow for manual selection of a cloud computing system based on the cost information.

In another example, parameter optimizer 134 can determine efficiency, resource, or optimization parameters associated with deploying the package 126 on multiple cloud computing systems, and can accordingly select a cloud computing system for deployment that is associated with certain parameter values or balance of multiple values (e.g., a cloud computing system having a lowest resource utilization and/or other efficiency metric).

In block 216, the method 200 can optionally include authenticating, based on determining the selected cloud computing system, with the selected cloud computing system. In an aspect, cloud selector 128 (e.g., in conjunction with processor 120 and/or memory 122 of a package deployment system 110, orchestration environment 132, etc.) can authenticate, based on determining the selected cloud computing system, an account with the selected cloud computing system. For example, the cloud computing systems may require authentication of a user account (e.g., with username and password credentials, a security key or token, etc.) to communicate therewith. Package deployment system 110 can previously have received or configured the authentication credentials for each of the multiple cloud computing systems, which may have been received based on registering with the multiple cloud computing systems (e.g., to receive a level of access or subscription). In an example, package deployment system 110 can be linked to the multiple cloud computing systems in this regard. In another example, as described, orchestration environment 132 can manage connection with the multiple cloud computing systems, and cloud selector 128 can employ the orchestration environment 132 for authenticating with and/or communicating with the selected cloud computing system, as described herein.

In block 218, the method 200 can include deploying the package to the selected cloud computing system. In an aspect, package deployer 130 (e.g., in conjunction with processor 120 and/or memory 122 of a package deployment system 110, orchestration environment 132, etc.) can deploy the package to the selected cloud computing system. Where authentication is performed, for example, deploying the package can be based on authenticating with the selected cloud computing system, as described. In an example, package deployer 130 can deploy the package by uploading the package (e.g., the software container, file or data package) to the selected cloud computing system via an interface and/or based on an authenticated account with the selected cloud computing system. The selected cloud computing system can then facilitate access to the package (e.g., the software container, build, file or data package) to the public, to certain accounts, to users of a private network, etc.

In block 220, the method 200 can optionally include removing, from a previous cloud computing system, a previous package associated with the package. In an aspect, package deployer 130 (e.g., in conjunction with processor 120 and/or memory 122 of a package deployment system 110, orchestration environment 132, etc.) can remove, from the previous cloud computing system, the previous package associated with the package. For example, package deployer 130 can remove the previous package based on deploying the package on a different cloud computing system or otherwise based on an indication (e.g., received via the interface) or determination to remove the previous package. In an example, package deployer 130 can communicate with the cloud computing system to indicate to remove the package (e.g., via orchestration environment 132 or otherwise).

Figure 3:
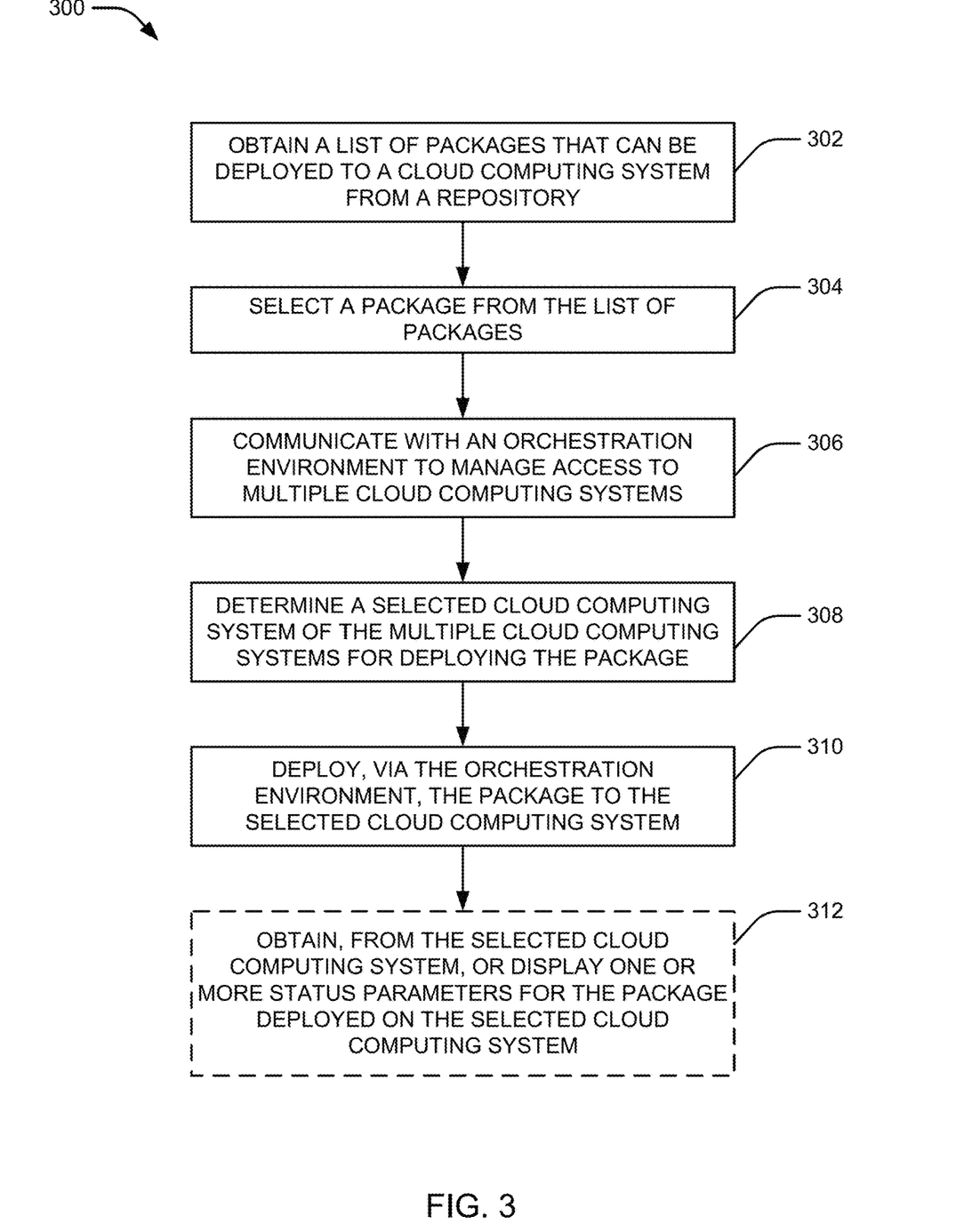
FIG. 3 illustrates a flowchart showing an example method for using an orchestration environment to deploy packages according to one aspect of the disclosure.

Referring now to FIG. 3, which is described in conjunction with the example operating environment 100 of FIG. 1, an example method 300 for deploying a package via an operating environment is illustrated.

In block 302, the method 300 can include obtaining a list of packages that can be deployed to a cloud computing system from a repository. In an aspect, package deployment system 110 (e.g., via processor 120 and/or memory 122) can obtain the list of packages that can be deployed to the cloud computing system from the repository. For example, package deployment system 110 can obtain the list of packages from the repository 102. The list of packages can include packages 126, which may be software containers, builds. files, data packages, etc., as described herein, stored in the repository 102 (or multiple repositories accessible by the package deployment system 110). Package deployment system 110 can obtain the list of packages based on a request for the list (e.g., initiated by an interface), based on receiving an indication of one or more packages ready for deployment from the repository 102, etc.

In block 304, the method 300 can include selecting a package from the list of packages. In an aspect, package obtainer 124 (e.g., in conjunction with processor 120 and/or memory 122 of a package deployment system 110) can select the package from the list of packages. In an example, where package deployment system 110 displays the list of packages on an interface, package obtainer 124 can select the package based on receiving an indication to select the package via the interface. In other examples, package deployment system 110 can determine to select the package from the list of packages based on other parameters or considerations, such as determining that the package has been modified or updated, etc.

In block 306, the method 300 can include communicating with an orchestration environment to manage access to multiple cloud computing systems. In an aspect, package deployment system 110 (e.g., via processor 120 and/or memory 122) can communicate with the orchestration environment (e.g., orchestration environment 132) to manage access to the multiple cloud computing systems (e.g., cloud 1 104, cloud 2 106, . . . , cloud N 108). For example, orchestration environment 132 can manage communications with the multiple cloud computing systems based on managing access thereto, which may include the orchestration environment 132 authenticating with the multiple cloud computing systems using configured account credentials. In this regard, orchestration environment 132 can also be configured to upload packages to the cloud computing systems, obtain from the cloud computing systems status parameters, metrics, etc. related to the packages, and/or the like, which may be based on API calls to the cloud computing systems.

In block 308, the method 300 can include determining a selected cloud computing system of the multiple cloud computing systems for deploying the package. In an aspect, cloud selector 128 (e.g., in conjunction with processor 120 and/or memory 122 of a package deployment system 110) can determine the selected cloud computing system of the multiple cloud computing systems for deploying the package. As described above, cloud selector 128 can determine the selected cloud computing system based on selecting the cloud computing system considering parameters related to cost, performance, etc., or can receive a selection of a cloud computing system (e.g., via the interface).

In block 310, the method 300 can include deploying, via the orchestration environment, the package to the selected cloud computing system. In an aspect, package deployer 130 (e.g., in conjunction with processor 120 and/or memory 122 of a package deployment system 110, orchestration environment 132, etc.) can deploy, via the orchestration environment, the package to the selected cloud computing system. For example, package deployer 130 can upload the package (e.g., the software container, build, file, data package, etc.) to the selected cloud computing system. This may include leveraging the orchestration environment 132 to communicate with the selected cloud computing system, authenticate with the selected cloud computing system, upload the package to the selected cloud computing system, and/or the like. In addition, as described, package deployer 130 may remove a previous associated package from a cloud computing system in favor of the new package. In other examples, package deployer 130, via orchestration environment 132 or otherwise, can deploy the package and/or manage deployment of the package to multiple cloud computing systems.

In one example, orchestration environment 132 may be used to deploy software containers but may not be used to deploy data packages or other non-software containers. In this example, for a data package, cloud selector 128 may select the cloud computing system, and package deployer 130 may send the data package to the cloud computing system without interacting with the orchestration environment 132. In this example, the orchestration environment 132 can be designed for use with software containers.

In block 312, the method 300 can optionally include obtaining, from the selected cloud computing system, or displaying one or more status parameters for the package deployed on the selected cloud computing system. In an aspect, package deployment system 110 (e.g., via processor 120 and/or memory 122 and/or in conjunction with orchestration environment 132, etc.) can obtain, from the selected cloud computing system, or display (e.g., via an interface) one or more status parameters for the package deployed on the selected cloud computing system. For example, package deployment system 110 can use orchestration environment to query and/or receive parameters from the multiple cloud computing systems. In one example, the parameters may relate to the package, such as a number of instances of a software container currently or historically executed on the cloud computing system, a size of the software container, a version of the software in the container, a health status of the software in execution (e.g., running, inactive, error codes, etc.). In another example, the parameters may relate to the cloud computing system, such as space available for the account, performance metrics of the cloud computing system, a cost associated with storing or executing the package, etc. In an example, package deployment system 110 can display the parameter values on an interface. In other examples, as described herein, parameter optimizer 134 can determine an optimal cloud computing system for deploying the package based on the parameter values.

Figure 4:
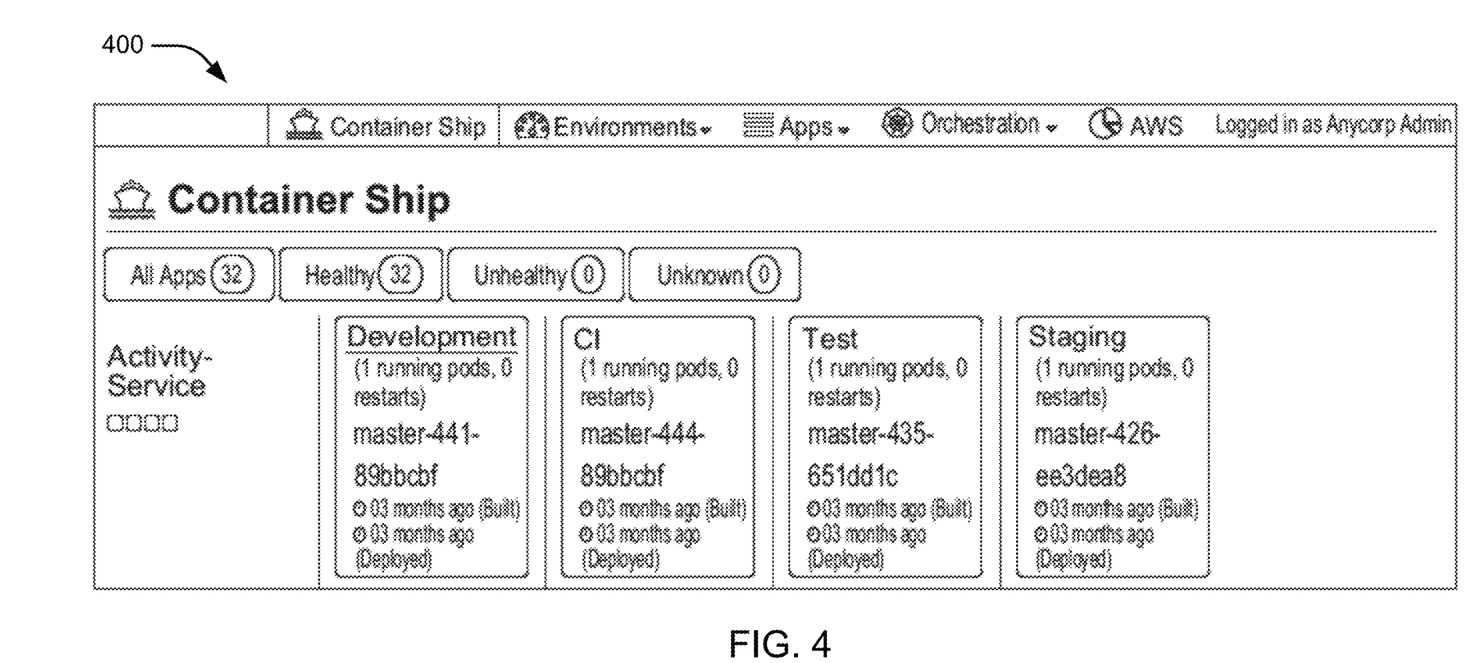
FIG. 4 illustrates an example of an interface for displaying available containers of one or more repositories according to one aspect of the disclosure.

FIG. 4 illustrates an example of an interface 400 for displaying available containers of one or more repositories in accordance with aspects described herein. The interfaces described herein can be graphical user interfaces (GUIs) displayed by a display on a computing device and/or allowing interaction therewith via one or more input devices. In an example, package deployment system 110 can use an interface, such as interface 400, to display containers available for a given software package (named Activity-Service, in this example). The containers can include a Development container, CI container, Test container, and Staging container, each of which can be stored in one or more repositories 102 and/or for deploying to one or more cloud computing systems. In one example, interface 400 can display the various containers that can be deployed and can allow for selection of the one or more containers to be deployed.

Figure 5:
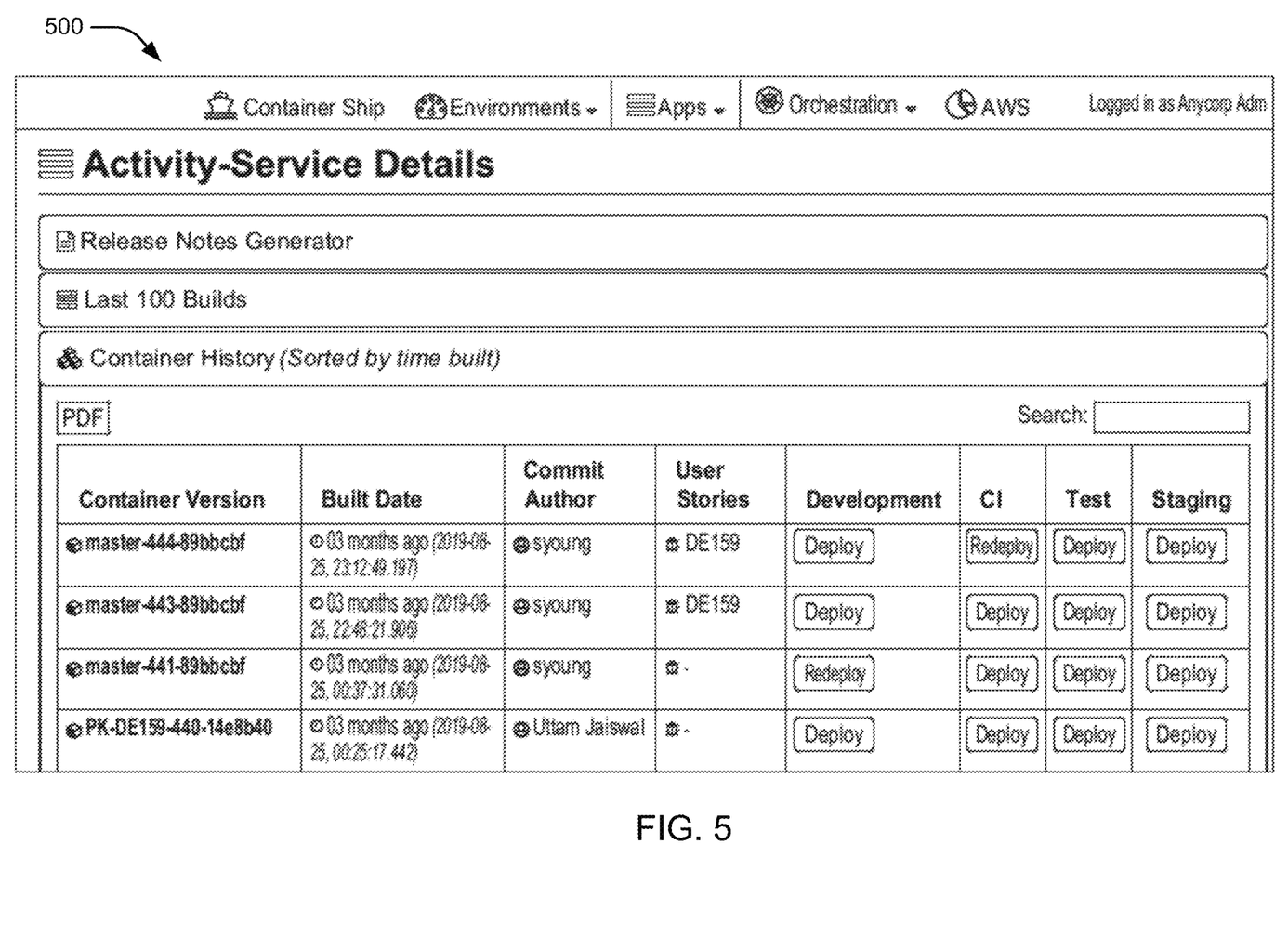
FIG. 5 illustrates an example of an interface for displaying container status information as applied to deployment of the containers in one or more cloud computing systems according to one aspect of the disclosure.

FIG. 5 illustrates an example of an interface 500 for displaying container status information as applied to deployment of the containers in one or more cloud computing systems in accordance with aspects described herein. In an example, package deployment system 110 can use an interface, such as interface 500, to display deployment status information for one or more containers, as described herein. For example, for the given software package (Activity-Service), interface 500 displays a container version, build date, author, and deployment status for the different corresponding containers "Development container, CI container, Test container, and Staging container," which may indicate if deployed, a deploy selection, a redeploy selection, etc. In an example, package deployment system 110 can use an interface such as interface 500 to allow for deploying selected container versions to one or more cloud computing systems.

Figure 6:
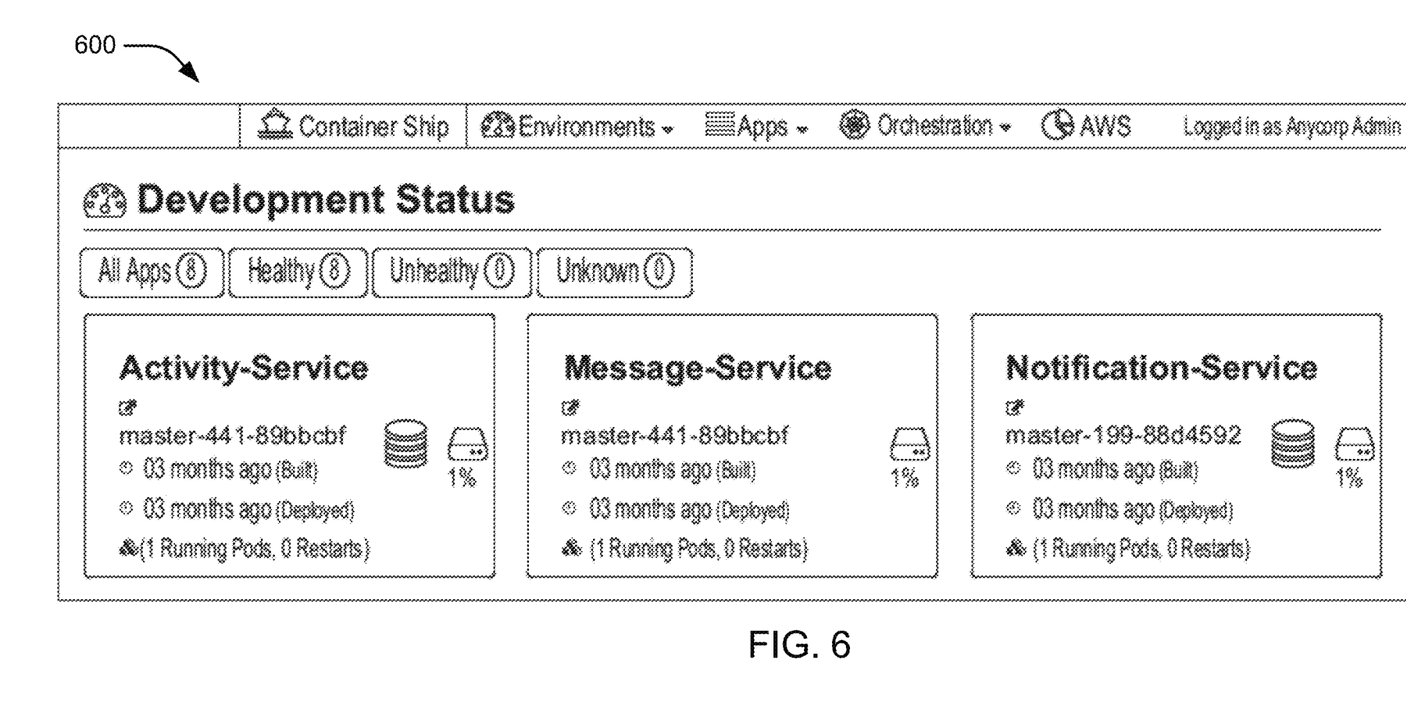
FIG. 6 illustrates an example of an interface for displaying deployment status of one or more software packages or corresponding containers according to one aspect of the disclosure.

FIG. 6 illustrates an example of an interface 600 for displaying deployment status of one or more software packages or corresponding containers in accordance with aspects described herein. In an example, package deployment system 110 can use an interface, such as interface 600, to display the deployment status of multiple software packages (named Activity-Service, Message-Service, Notification-Service, in this example) which can be deployed on different cloud computing systems and/or can have associated containers that are deployed of different cloud computing systems. Interface 600 can include status information such as a build or deployment time, a number of instances of the software package that are executing, etc. As described, package deployment system 110 can obtain the status information from the orchestration environment 132 that communicates with the various cloud computing systems.

Figure 7:
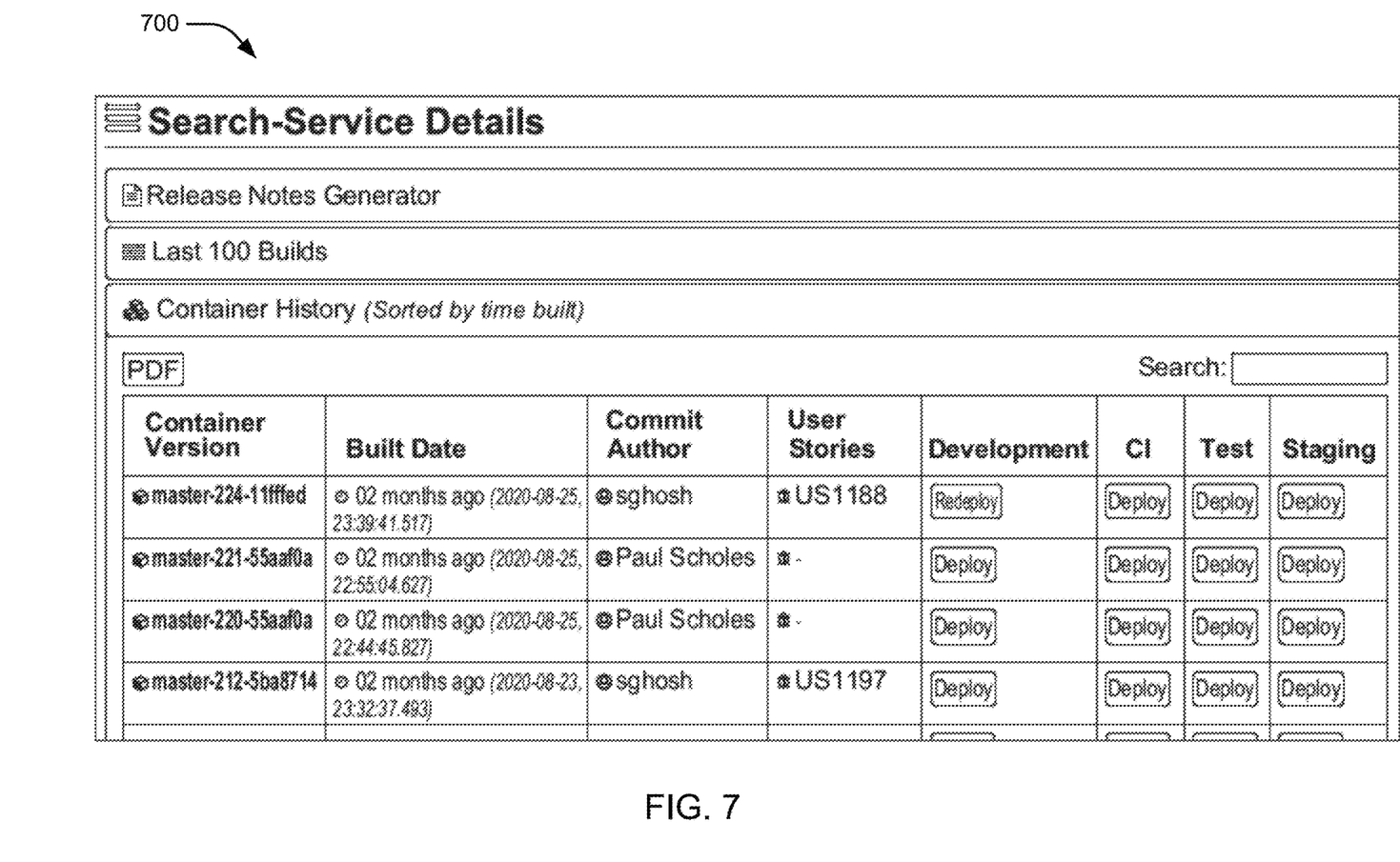
FIG. 7 illustrates an example of an interface for deploying available packages to a cloud computing system according to one aspect of the disclosure.

FIG. 7 illustrates an example of an interface 700 for deploying one or more packages to one or more cloud computing systems in accordance with aspects described herein. In an example, package deployment system 110 can use an interface, such as interface 700, to deploy a package to a cloud computing system, as described herein. For example, for the given software package (Activity-Service), interface 700 displays a container version, build date, author, and an option to deploy (e.g., by selecting a Deploy button) various container types for each given version, which may include a Development container, CI container, Test container, and Staging container for each version In an example, package deployment system 110 can use an interface such as interface 700 to allow for deploying selected package types including Development, CI, Test, and Staging, each to one or more cloud computing systems.

Figure 8:
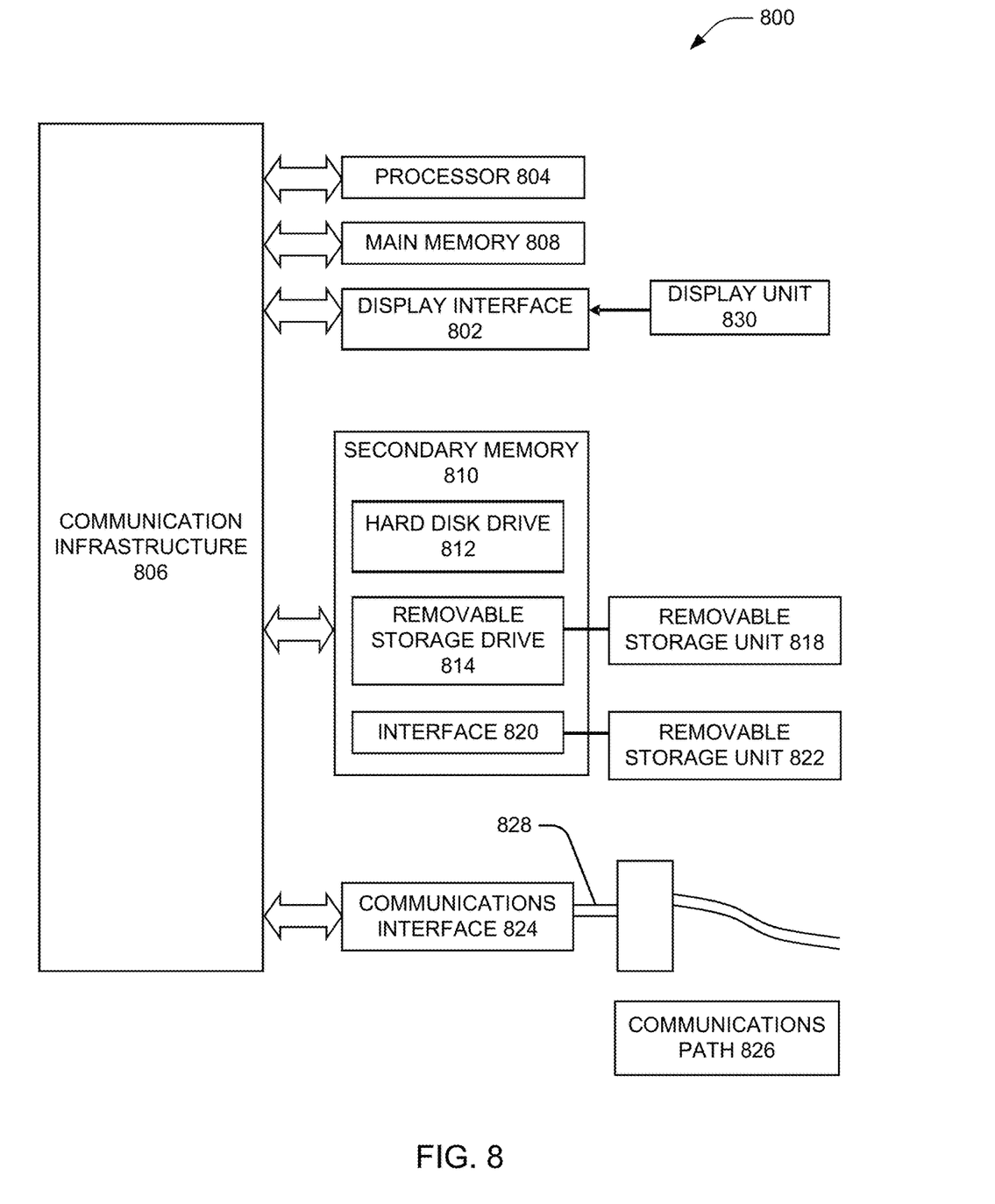
FIG. 8 presents an example system diagram of various hardware components and other features according to one aspect of the disclosure.

FIG. 8 presents an example system diagram of various hardware components and other features, for use in accordance with an aspect of the present disclosure. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system 800 is shown in FIG. 8.

Computer system 800 includes one or more processors, such as processor 804. The processor 804 is connected to a communication infrastructure 806 (e.g., a communications bus, cross-over bar, or network). In one example, processor 120 can include processor 804. Various software aspects are described in terms of this example computer system. After reading this description, it will become apparent to a person skilled in the relevant art(s) how to implement aspects described herein using other computer systems and/or architectures.

Computer system 800 can include a display interface 802 that forwards graphics, text, and other data from the communication infrastructure 806 (or from a frame buffer not shown) for display on a display unit 830. Computer system 800 also includes a main memory 808, preferably random access memory (RAM), and can also include a secondary memory 810. The secondary memory 810 can include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc., which is read by and written to removable storage drive 814. As will be appreciated, the removable storage unit 818 includes a computer usable storage medium having stored therein computer software and/or data.

In alternative aspects, secondary memory 810 can include other similar devices for allowing computer programs or other instructions to be loaded into computer system 800. Such devices can include, for example, a removable storage unit 822 and an interface 820. Examples of such can include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800. In an example, memory 122 can include one or more of main memory 808, secondary memory 810, removable storage drive 814, removable storage unit 818, removable storage unit 822, etc.

Computer system 800 can also include a communications interface 824. Communications interface 824 allows software and data to be transferred between computer system 800 and external devices. Examples of communications interface 824 can include a modem, a network interface (such as an Ethernet card), a communications port, a Personal Computer Memory Card International Association (PCMCIA) slot and card, etc. Software and data transferred via communications interface 824 are in the form of signals 828, which can be electronic, electromagnetic, optical or other signals capable of being received by communications interface 824. These signals 828 are provided to communications interface 824 via a communications path (e.g., channel) 826. This path 826 carries signals 828 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 814, a hard disk installed in hard disk drive 812, and signals 828. These computer program products provide software to the computer system 800. Aspects described herein can be directed to such computer program products. Communication device 118 can include communications interface 824.

Computer programs (also referred to as computer control logic) are stored in main memory 808 and/or secondary memory 810. Computer programs can also be received via communications interface 824. Such computer programs, when executed, enable the computer system 800 to perform various features in accordance with aspects described herein. In particular, the computer programs, when executed, enable the processor 804 to perform such features. Accordingly, such computer programs represent controllers of the computer system 800. Computer programs can include package obtainer 124, cloud selector 128, package deployer 130, orchestration environment 132, parameter optimizer 134, etc.

In variations where aspects described herein are implemented using software, the software can be stored in a computer program product and loaded into computer system 800 using removable storage drive 814, hard disk drive 812, or communications interface 820. The control logic (software), when executed by the processor 804, causes the processor 804 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 9:
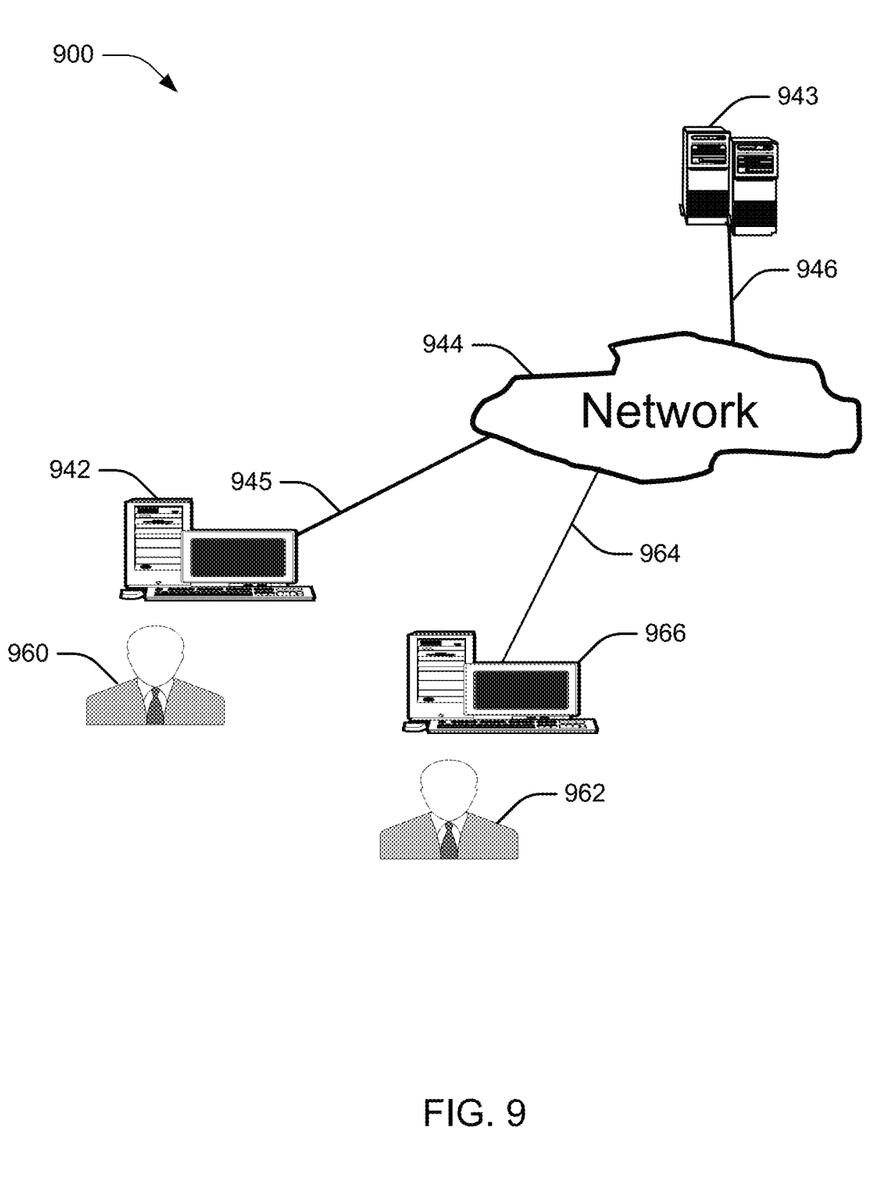
FIG. 9 is a block diagram of various example system components according to one aspect of the disclosure.

FIG. 9 is a block diagram of various example system components, in accordance with an aspect. FIG. 9 shows a communication system 900 usable in accordance with aspects described herein. The communication system 900 includes one or more accessors 960, 962 (also referred to interchangeably herein as one or more "users") and one or more terminals 942, 966. For example, terminals 942, 966 can include package deployment system 110, processor 120, communication device 118, etc.), repository 102, cloud computing systems (e.g., cloud 1 104, cloud 2 106, . . . , cloud N 108), and/or the like. In one aspect, data for use in accordance with aspects described herein is, for example, input and/or accessed by accessors 960, 962 via terminals 942, 966, such as personal computers (PCs), minicomputers, mainframe computers, microcomputers, telephonic devices, or wireless devices, such as personal digital assistants ("PDAs") or a hand-held wireless devices coupled to a server 943, such as a PC, minicomputer, mainframe computer, microcomputer, or other device having a processor and a repository for data and/or connection to a repository for data, via, for example, a network 944, such as the Internet or an intranet, and couplings 945, 946, 964. The couplings 945, 946, 964 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for managing or managing deployment of software packages or data packages to multiple cloud computing systems, comprising:
   obtaining, by at least one processor, a package that includes a software container, a file, or a data package, wherein the package is compatible to be deployed to multiple cloud computing systems including obtaining multiple containers of the package;
   managing, for the package, access to the multiple cloud computing systems based on configured account credentials for each of the multiple cloud computing systems;
   selecting, by the at least one processor, from the multiple cloud computing systems to which access is managed, a cloud computing system to which to deploy one or more of the multiple containers of the package, wherein selecting the selected cloud computing system includes:
      determining whether the package is to be deployed to a spot instance or a reserved instance, wherein the multiple cloud computing systems each have separate costs for spot instances and reserved instances; and
      determining, based on a cost associated with deploying the package to the spot instance or the reserved instance on the selected cloud computing system, the selected cloud computing system as an optimal option of the multiple cloud computing systems for deploying the package, wherein the cost is based on a size of the package;
   authenticating, based on selecting the selected cloud computing system, an account with the selected cloud computing system based on the configured account credentials for the selected cloud based computing system;
   deploying, based on authenticating the account with the selected cloud computing system, the one or more containers of the package to the selected cloud computing system; and
   removing, based on deploying the one or more containers of the package to the selected cloud computing system, a previous version of the one or more containers of the package from at least one of the multiple cloud computing systems.

2. The method of claim 1, further comprising providing an interface that facilitates selection of the selected cloud computing system from the multiple cloud computing systems for deploying the package, wherein selecting the selected cloud computing system is based on receiving, from the interface, an indication of selection of the selected cloud computing system.

3. The method of claim 2, further comprising:
   obtaining a list of packages from a repository; and
   displaying, via the interface, the list of packages for selection, wherein obtaining the package is based on receiving, from the interface, an indication of selection of the package from the list of packages.

4. The method of claim 3, wherein the list of packages includes at least one of a list of one or more binaries stored in the repository that are compatible for execution via the multiple cloud computing systems or a list of one or more data collections stored in the repository that are compatible for accessing via the multiple cloud computing systems.

5. The method of claim 2, further comprising displaying, via the interface, a list of multiple packages from a repository along with an indication of one of the multiple cloud computing systems to which each package in the list of multiple packages is deployed.

6. The method of claim 1, further comprising managing accessing the multiple cloud computing systems via an orchestration environment, wherein deploying the package to the selected cloud computing system includes providing the package to the selected cloud computing system via the orchestration environment.

7. The method of claim 6, further comprising providing an interface that obtains, from the orchestration environment, one or more status parameters of the package deployed on the selected cloud computing system, and displays the one or more status parameters.

8. The method of claim 1, wherein determining the selected cloud computing system as the optimal option of the multiple cloud computing systems is based on determining that the selected cloud computing system provides a lowest cost option of the multiple cloud computing systems for deploying the package.

9. A system for managing or managing deployment of software packages or data packages to multiple cloud computing systems, comprising:
   a memory; and
   at least one processor coupled to the memory and configured to:
      obtain a package that includes a software container, a file, or a data package, wherein the package is compatible to be deployed to multiple cloud computing systems including obtaining multiple containers of the package;
      manage, for the package, access to the multiple cloud computing systems based on configured account credentials for each of the multiple cloud computing systems;
      select, from the multiple cloud computing systems to which access is managed, a cloud computing system to which to deploy one or more of the multiple containers of the package, including:
         determining whether the package is to be deployed to a spot instance or a reserved instance, wherein the multiple cloud computing systems each have separate costs for spot instances and reserved instances; and
         determining, based on a cost associated with deploying the package to the spot instance or the reserved instance on the selected cloud computing system, the selected cloud computing system as an optimal option of the multiple cloud computing systems for deploying the package is selected from the multiple cloud computing systems, wherein the cost is based on a size of the package;
      authenticate, based on determining the selected cloud computing system, an account with the selected cloud computing system based on the configured account credentials for the selected cloud based computing system;
      deploy, based on authenticating the account with the selected cloud computing system, the one or more containers of the package to the selected cloud computing system; and
      remove, based on deploying the one or more containers of the package to the selected cloud computing system, a previous version of the one or more containers of the package from at least one of the multiple cloud computing systems.

10. The system of claim 9, wherein the at least one processor is further configured to provide, via a display, an interface that facilitates selection of the selected cloud computing system from the multiple cloud computing system for deploying the package, wherein the at least one processor is configured to select the selected cloud computing system based on receiving, from the interface, an indication of selection of the selected cloud computing system.

11. The method of claim 3, wherein deploying the package includes deploying the multiple containers of the package to the selected cloud computing system, and wherein the multiple containers include at least a development container and a staging container for the package.

12. The method of claim 1, further comprising:
deploying, by the at least one processor and to a second cloud computing system of the multiple cloud computing systems to which access is managed, one or more other containers of the multiple containers of the package.

13. The system of claim 10, wherein the at least one processor is further configured to:
obtain a list of packages from a repository; and
display, via the interface, the list of packages for selection, wherein the at least one processor is configured to obtain the package based on receiving, from the interface, an indication of selection of the package from the list of packages.

14. The system of claim 13, wherein the list of packages includes a list of one or more binaries stored in the repository that are compatible for execution via the multiple cloud computing systems.

15. The system of claim 13, wherein the list of packages includes a list of one or more data collections stored in the repository that are compatible for accessing via the multiple cloud computing systems.

16. The system of claim 10, wherein the at least one processor is further configured to display, via the interface, a list of multiple packages from a repository along with an indication of one of the multiple cloud computing systems to which each package in the list of multiple packages is deployed.

17. The system of claim 9, wherein the at least one processor is further configured to manage accessing the multiple cloud computing systems via an orchestration environment, wherein the at least one processor is configured to deploy the package to the selected cloud computing system based on providing the package to the selected cloud computing system via the orchestration environment.

18. A non-transitory computer-readable medium storing computer executable code for managing or managing deployment of software packages or data packages to multiple cloud computing systems, comprising code for:

obtaining a package that includes a software container, a file, or a data package, wherein the package is compatible to be deployed to multiple cloud computing systems including obtaining multiple containers of the package;
managing, for the package, access to the multiple cloud computing systems based on configured account credentials for each of the multiple cloud computing systems;
selecting, from the multiple cloud computing systems to which access is managed, a cloud computing system to which to deploy one or more of the multiple containers of the package, wherein selecting the selected cloud computing system includes:
determining whether the package is to be deployed to a spot instance or a reserved instance, wherein the multiple cloud computing systems each have separate costs for spot instances and reserved instances; and
determining, based on a cost associated with deploying the package to the spot instance or the reserved instance on the selected cloud computing system, the selected cloud computing system as an optimal option of the multiple cloud computing systems for deploying the package is selected from the multiple cloud computing systems, wherein the cost is based on a size of the package;
authenticating, based on determining the selected cloud computing system, an account with the selected cloud computing system based on the configured account credentials for the selected cloud based computing system;
deploying, based on authenticating the account with the selected cloud computing system, the one or more containers of the package to the selected cloud computing system; and
removing, based on deploying the one or more containers of the package to the selected cloud computing system, a previous version of the one or more containers of the package from at least one of the multiple cloud computing systems.

19. The non-transitory computer-readable medium of claim 18, further comprising code for providing an interface that facilitates selection of the selected cloud computing system from the multiple cloud computing system for deploying the package, wherein the code for selecting selects the selected cloud computing system based on receiving, from the interface, an indication of selection of the selected cloud computing system.

* * * * *